US008016310B2

(12) United States Patent
Kylstra et al.

(10) Patent No.: US 8,016,310 B2
(45) Date of Patent: Sep. 13, 2011

(54) WHEELCHAIR RETROFIT ASSEMBLY WITH MULTIPLE DIMENSIONS OF ADJUSTMENT

(75) Inventors: Bart Kylstra, San Francisco, CA (US); Nathan Jauvtis, Felton, CA (US)

(73) Assignee: Daedalus Wings, Inc., San Francisco, CA (US)

( * ) Notice: Subject to any disclaimer, the term of this patent is extended or adjusted under 35 U.S.C. 154(b) by 496 days.

(21) Appl. No.: 12/229,147

(22) Filed: Aug. 20, 2008

(65) Prior Publication Data

US 2009/0051139 A1 Feb. 26, 2009

Related U.S. Application Data

(60) Provisional application No. 60/965,257, filed on Aug. 20, 2007.

(51) Int. Cl.
*B62M 1/16* (2006.01)

(52) U.S. Cl. .................... 280/250.1; 280/244; 280/246; 280/304.1

(58) Field of Classification Search ............... 280/250.1, 280/304.1, 244, 246, 255
See application file for complete search history.

(56) References Cited

U.S. PATENT DOCUMENTS

| | | | | |
|---|---|---|---|---|
| 1,550,479 | A * | 8/1925 | Wiora | 280/7.17 |
| 4,652,026 | A * | 3/1987 | Byrge | 280/250.1 |
| 5,020,815 | A | 6/1991 | Harris et al. | |
| 6,158,757 | A * | 12/2000 | Tidcomb | 280/250.1 |
| 6,296,265 | B1 * | 10/2001 | Lovins | 280/250.1 |
| 2008/0073869 | A1 | 3/2008 | Patterson | |
| 2008/0238022 | A1 * | 10/2008 | Kylstra et al. | 280/244 |
| 2009/0051138 | A1 * | 2/2009 | Kylstra | 280/304.1 |

* cited by examiner

*Primary Examiner* — Anne Marie Boehler
(74) *Attorney, Agent, or Firm* — Schneck & Schneck

(57) ABSTRACT

An assembly for attachment of a propulsion system to a wheelchair frame includes a clamp which remains fixed to the frame, while an attachment device that enables three dimensions of adjustability permits quick release of a main wheel and the propulsion system (e.g., lever drive, pushrim and motor drive) that propels the main wheel. The clamp includes a first alignment feature, such as a pin. A spring-loaded latch may also be included. The attachment device includes a second alignment feature, such as a hole or slot, configured to mate with the first. To permit alignment for a number of different wheelchair frame geometries, the attachment device is rotatable to provide angular adjustability, structured to permit lengthwise adjustability, and coupled using hardware which provides offset adjustability in a direction generally parallel to the axis of the wheel.

20 Claims, 8 Drawing Sheets

WHEELCHAIR RETROFIT ASSEMBLY WITH MULTIPLE DIMENSIONS OF ADJUSTMENT

CROSS REFERENCE TO RELATED APPLICATION

This application claims priority from co-pending provisional application No. 60/965,257, filed Aug. 20, 2007.

TECHNICAL FIELD

The invention relates generally to wheelchairs and more particularly to quick-release assemblies for attaching a propulsion system, such as lever propulsion, to a wheelchair.

BACKGROUND ART

Traditionally, pushrim propulsion has been used in powering a wheelchair. Pushrims are provided adjacent to the main wheels of the wheelchair, allowing a user to apply force to the pushrims in order to move the wheelchair forwardly or rearwardly. A concern with the use of pushrim propulsion is that the poor human-to-chair biomechanics result in efficiencies and sometimes injury. Users of pushrim wheelchairs may suffer from Repetitive Strain Injuries (RSI) of the wrists and shoulders.

Another approach for manual wheelchairs is the use of levers which are "rowed." It has been shown that lever propulsion avoids the ergonomic and inefficiency shortcomings of the pushrim approach.

Often, the two main wheels of a wheelchair are connected to the wheelchair frame by quick-release mechanisms. This allows the wheels to be removed for purposes of storage or transportation. Additionally, when advancements occur in the design of wheelchair propulsion, the use of quick-release mechanisms readily allow "upgrades" to existing wheelchair frames. However, a difficulty is that wheelchair frames have various geometries, so that an attachment assembly for an upgrade may be suitable for only a limited number of possible wheelchair frames. A second possible problem is that the attachment of a lever propulsion system to a wheelchair frame must withstand significant torque that is generated during rowing of a lever.

U.S. Pat. No. 5,020,815 to Harris et al. describes a retrofitable attachment for converting conventional wheelchairs into steerable self-propelled wheelchairs. Various connections are made to the wheelchair, including connections to the front caster wheels in order to provide the steering capability. While the system described in Harris et al. operates well for its intended purpose, the attachment requirements are significant and the chair loses its quick-release feature for removing the drive wheels.

U.S. Patent Publication No. 2008/0073869 to Patterson describes a lever propulsion system which may be attached to a wheelchair that maintains its quick-release capability. The assembly is connected to the seat tube of the wheelchair frame by a clamp.

It would be beneficial to provide an attachment approach which accommodates retrofit to a greater variety of different wheelchair designs, while still allowing the quick-release capability for removing the two main drive wheels.

SUMMARY OF THE INVENTION

An assembly for attachment of a lever propulsion system enables use with a wide variety of different wheelchair designs, since three dimensions of adjustment are permitted at an attachment point. The assembly for attachment to the frame of a wheelchair includes a main wheel and a lever drive coupled to translate strokes of the lever to rotation of the wheel. A clamp having a first alignment feature is attached to the wheelchair and remains attached to the wheelchair frame when the main wheel and the lever drive are removed for purposes of wheelchair storage and transportation. The assembly operates particularly well for attachment of a lever propulsion system, but is applicable to attaching other types of propulsion systems to a wheelchair, including pushrim and motor-driven propulsion systems.

An attachment device is used for releasably connecting the lever drive to the clamp. The attachment device has three dimensions of adjustment. The attachment device is rotatable to provide angular adjustability. Additionally, the attachment device may be varied in length to provide length adjustability. The combination of angular and length adjustabilities allows the clamp to be moved laterally along a frame member, depending upon the wheelchair design, while still being accessible by the attachment device. A third dimension of adjustment provides offset adjustability of the attachment device in a direction generally parallel to the rotational axis of the wheel.

The end of the attachment device opposite to the axis about which it is rotatable includes a second alignment feature that is compatible with the alignment feature of the clamp. For example, if the alignment feature on the clamp is a pin, the second alignment feature may merely be a hole through the attachment device. As another example, the pin may be located on the attachment device. The attachment device is properly adjusted when the hole is aligned with the pin. The clamp may also include a spring-biased latch which secures the attachment device to the clamp when the pin is seated within the hole.

The length adjustability may be provided by forming the attachment device of two members which permit the second member to "telescope" inwardly and outwardly. The offset adjustability may be provided by connecting the attachment device to a bracket fixed to the lever drive such that threaded elements are cooperative to move the attachment member closer to or further from the bracket on the basis of relative positions of the threaded elements. These threaded elements may define the axis about which the attachment device rotates, so that the offset adjustability is along this axis. That is, a threaded element may secure the attachment device (1) such that rotating the threaded element while restraining the attachment device provides an offset adjustment and (2) such that rotating the attachment device while restraining the threaded element provides an angular adjustment.

For embodiments which utilize the latch, the edge of the attachment member close to the alignment feature (e.g., a hole) may have a curvature that accommodates different angles of the attachment device relative to the clamp. In some embodiments, it is possible to provide the latch on the attachment device. Moreover, some embodiments utilize other adjustable features. For example, a power link that couples the lever to a transmission of the wheel may be adjustable with respect to the power that is applied for a given stroke. The additional adjustable features may depend upon the type of propulsion system (e.g., lever, pushrim or motor) being attached to the wheelchair.

DETAILED DESCRIPTION

Figure 1:
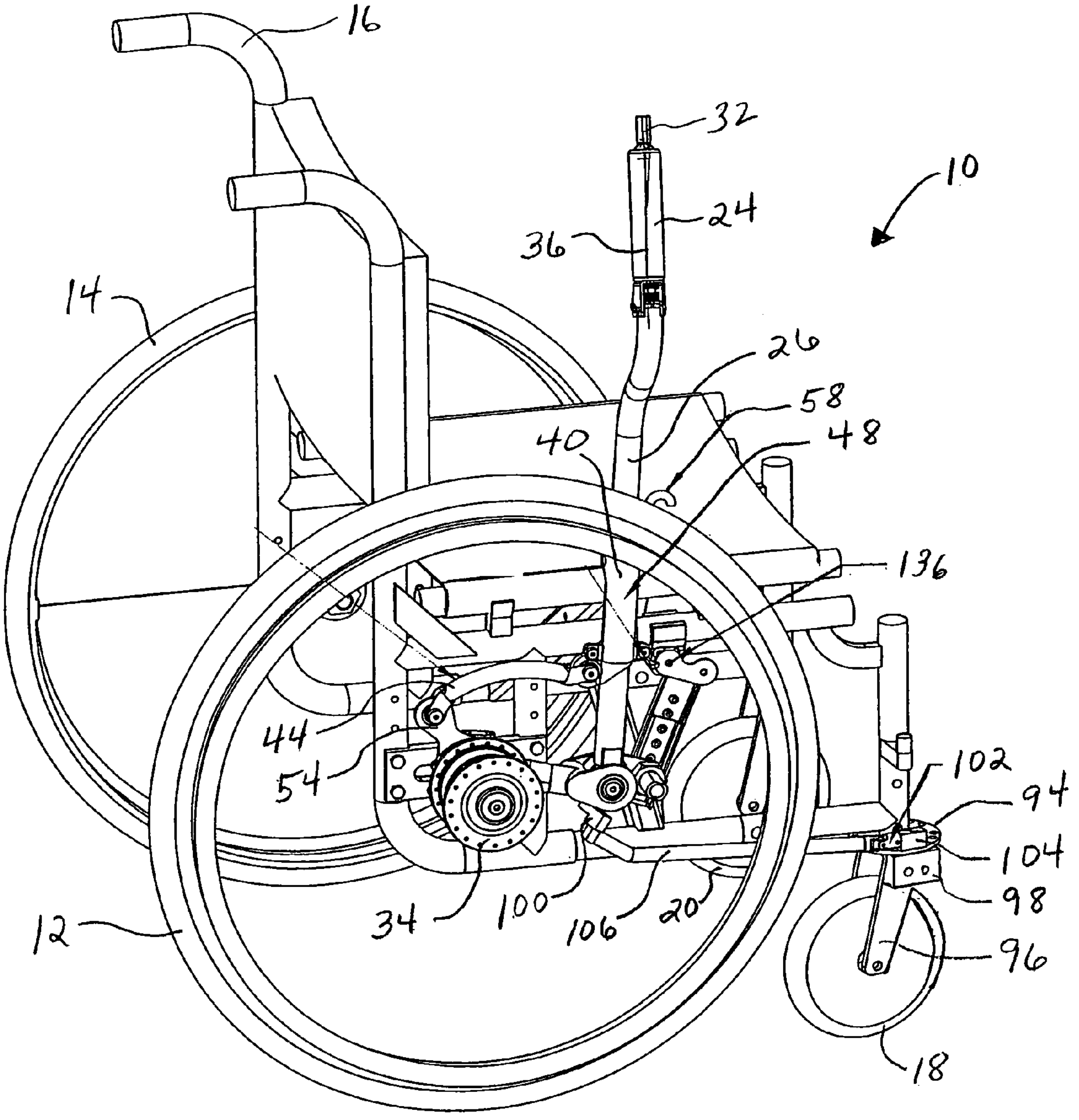
FIG. 1 is a perspective view of a wheelchair that includes a hand grip-triggering motion control system in accordance with one embodiment of the invention.

With reference to FIG. 1, a perspective view of a wheelchair 10 having a retrofit quick-release motion control system in accordance with one embodiment of the invention is shown. The motion control system utilizes lever propulsion, as will be described in detail below. While only one such system is shown, many applications will include the same system on the opposite side of the wheelchair. The second motion control system would in effect be a mirror image of the one shown in FIG. 1. The fully assembled wheelchair 10 of FIG. 1 includes a pair of drive wheels 12 and 14 at opposite sides of a frame 16. The geometry of the wheelchair frame is not significant to the present invention. In fact, the means for attaching the motion control assembly is designed to enable attachment to a wide range of different frame geometries. Nevertheless, it should be noted that the motion control system may be secured to a wheelchair frame using other approaches of attachment, and the attachment assembly to be described below may be used with other motion control systems.

The wheelchair frame 16 is formed of a number of tubular frame members, as is known in the art. In addition to the two main drive wheels 12 and 14, the wheelchair includes front steering caster wheels 18 and 20. The steering of the caster wheels will be described fully below.

Figure 2:
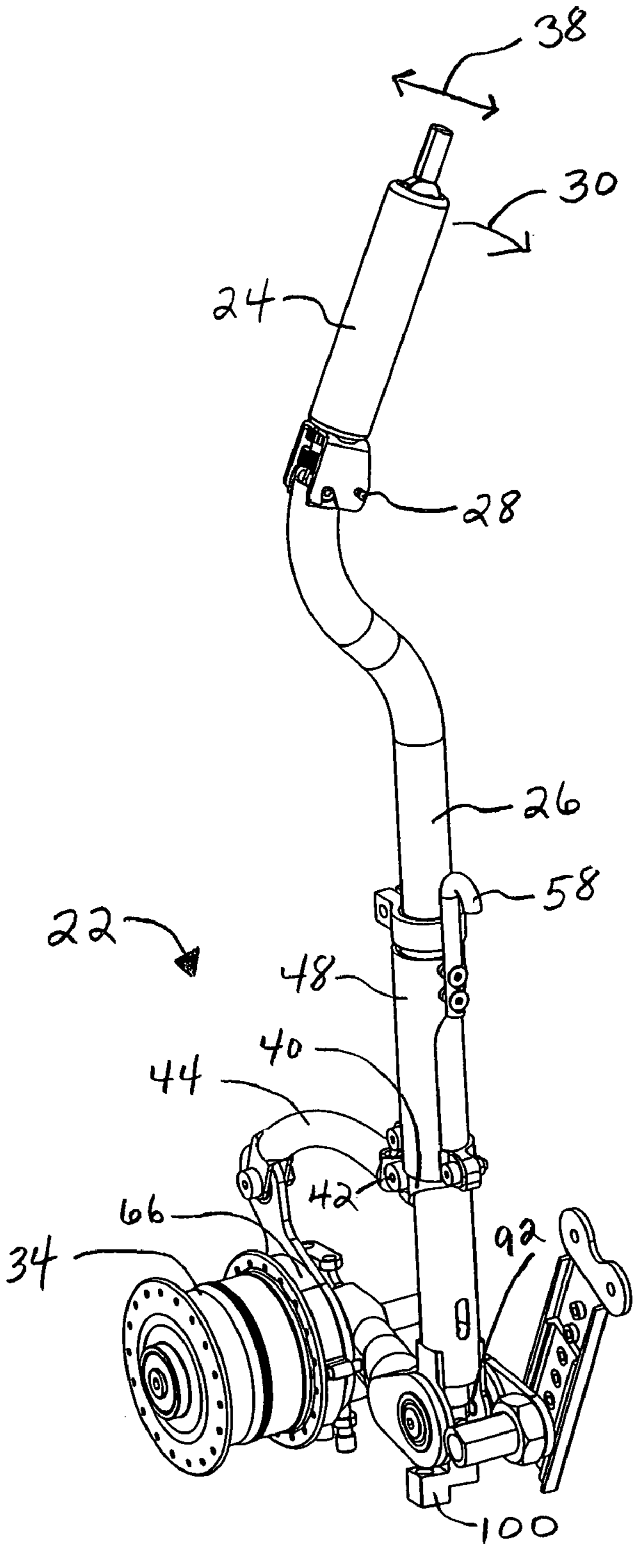
FIG. 2 is a perspective view of the motion control system of FIG. 1.

FIG. 2 illustrates one embodiment of the motion control system 22. In this embodiment, the system allows a user to (a) apply force in initiating and maintaining "rowing" of the lever drive, (b) apply controlled braking force, (c) set a parking brake mechanism, (d) shift among forward, neutral and rearward modes of operation, (e) steer a front caster wheel, and (f) adjust the applied power per lever stroke. The first five of these capabilities are controlled at the hand grip 24 of the system.

Referring to both FIGS. 1 and 2, the hand grip 24 is connected to the lever 26 along a pivot axis 28. The hand grip is shown in its rest position, but is mounted to pivot, as indicated by arrow 30. The hand grip is spring biased into this rest position, which may be referred to as the brake release position, since this position allows the drive wheel 12 to freely rotate.

The hand grip 24 includes a direction shifter 32. Central to the drive wheel 12 is a transmission-containing hub 34 that is operatively coupled to the direction shifter 32. The transmission within the hub is described in detail within U.S. patent application Ser. No. 12/079,745, to Kylstra et al., entitled "Wheelchair Drive System with Lever Propulsion and a Hub-Contained Transmission." However, the present invention is not limited to embodiments in which the transmission is contained within a hub.

FIG. 1 includes a representation of the top portion of a cable 36 which links the direction shifter 32 to the transmission. The transmission contained within the hub 34 includes at least two operational modes selected from the group of a forward mode, neutral mode and a rearward mode. In the forward mode, rowing of the lever 26 causes forward motion of the wheelchair. On the other hand, when the direction shifter is placed in its appropriate position, the rearward mode is triggered and rowing of the lever causes the wheelchair to move rearwardly. In the neutral mode, the motion of the lever does not induce wheelchair movement.

It has been determined that persons with dexterity limitations are still able to quickly and easily manipulate the direction shifter 32 when the shifter path from position-to-position is that shown in FIG. 2. Rather than a direction shifter which moves along a path generally aligned with the rowing plane of the lever 26, the direction shifter moves along a path that is substantially misaligned from the rowing plane. The direction of the shifter is shown by arrow 38. Thus, the plane in which the direction shifter moves may be the same as that of the pivot 30 of the hand grip 24. This arrangement allows a person with limited finger, thumb and/or wrist dexterity to move their hand such that the direction shifter is between the thumb and finger, allowing a simple rotation or similar motion of the entire hand to shift directions. For example, by moving the direction shifter "inboard," as viewed in FIG. 1, the transmission may be placed in its forward mode. An outboard thumb pressure may then place the direction shifter in a centered neutral position or a leftmost (as viewed in FIG. 2) rearward mode position. In other embodiments, the motion of the direction shifter is not precisely aligned with the motion of the hand grip in applying braking force. Instead, the path of the direction shifter is misaligned from both the path of the hand grip and the path of the lever 26. Optionally, the path of the direction shifter is adjustable in order to accommodate user preferences.

While not shown in the drawings, the direction shifter 32 preferably includes detents for the neutral position. This is significant since unlike a bicycle which always remains in a forward gear, there is a possibility that jarring or rugged terrain may result in inadvertent shifting that is potentially more hazardous than a shift in gear ratio. Designing the direction shifter to resist inadvertent shifting is desirable. Nevertheless, the required force by a person should be such that changes in operational modes can be easily accomplished using the thumb or palm of the person.

Figure 7:
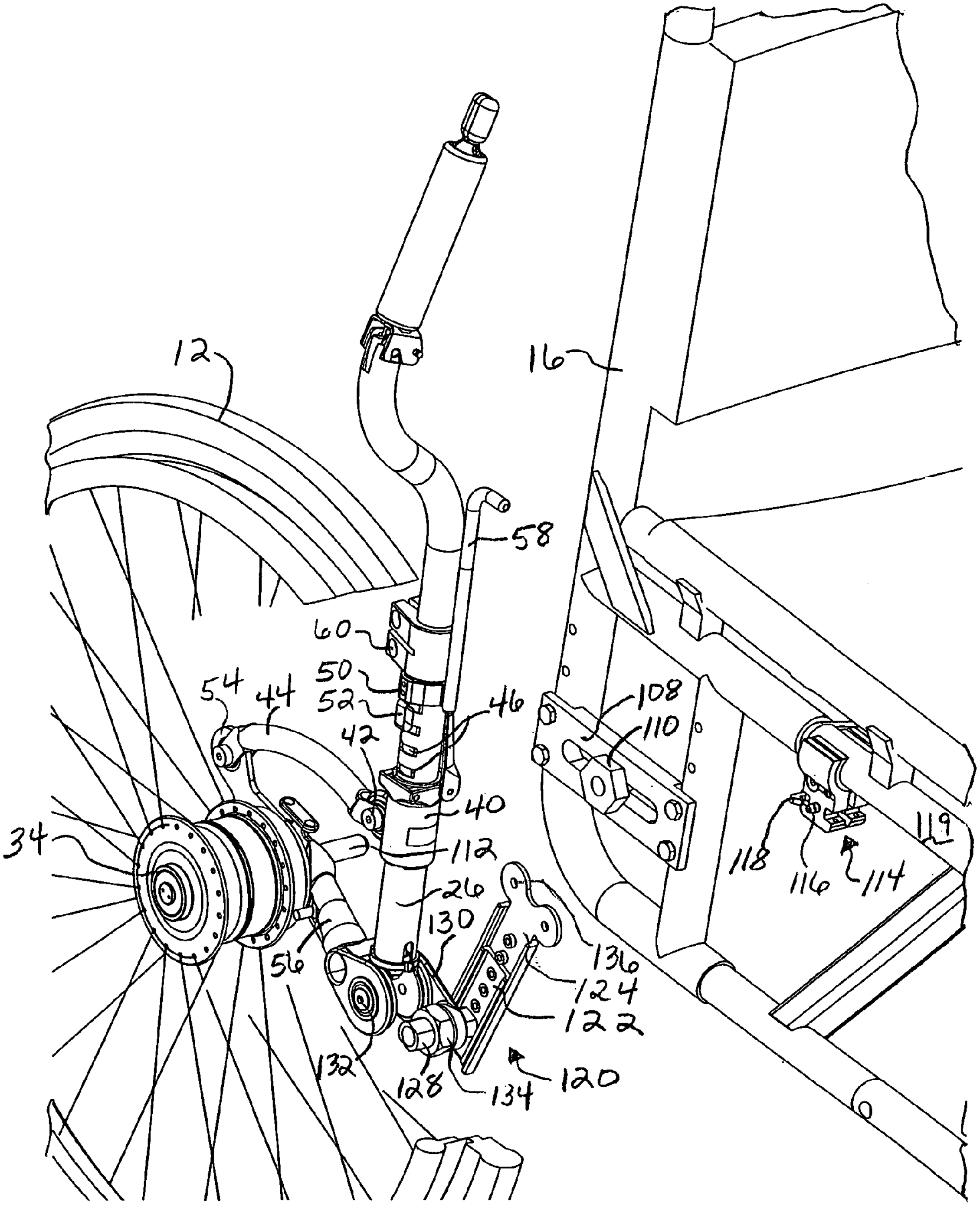
FIG. 7 is a perspective view in which the retrofit assembly is not entirely connected to the wheelchair of FIG. 1.

In addition to direction shifting, power shifting is available. Referring to FIGS. 1 and 2 and briefly to FIG. 7, a sliding bushing 40 is connected to move upwardly and downwardly along the lever 26. The sliding bushing carries a pivot bearing 42 for a power link 44. The sliding bushing is able to slide lengthwise along the arm, but it is held stable at various shift points defined along a lever. FIG. 7 illustrates a number of openings or flattened regions 46 that establish the shift points at which stability is achieved. The selection among the different shift points is one that establishes the gear ratio for the transmission-containing hub 34. The sliding bushing 40 is restrained from rotating on the lever by a yoked connection with the power link 44.

Extending upwardly from the sliding bushing 40 is a shift link 48 that operates with the openings or flattened regions 46 to define the stable shift point. The shift link has a collar 50 (FIG. 7) at its upper end. Within the interior of the collar is a detent, not shown, which mates with the selected opening or flattened region along the lever. The lower end of the shift link is fastened loosely to shoulder bolts that permit some degree of pivoting by the shift link. At the top of the shift link is a spring steel member 52 (FIG. 7) that provides bias of the shift link. With the detent pushed into a selected opening or flattened region 46, the shift link provides a means to stabilize the sliding bushing and, therefore, determines the angle of the power link 44 relative to a bracket 54 that is operative with the transmission contained within the hub 34. This angle determines the gear ratio, since the pivot end of the lever 26 is fixed in its position relative to the hub by a reaction arm 56.

To effect a change in the gear ratio, the user need only push the top of the shift link 48 in an inboard direction and then slide the mechanism upwardly or downwardly as desired. A hook 58 is included to accommodate the raising or lowering of the shift link. A fixed collar 60 is included along the length of the lever 26 to limit the upper movement of the shift link.

Figure 3:
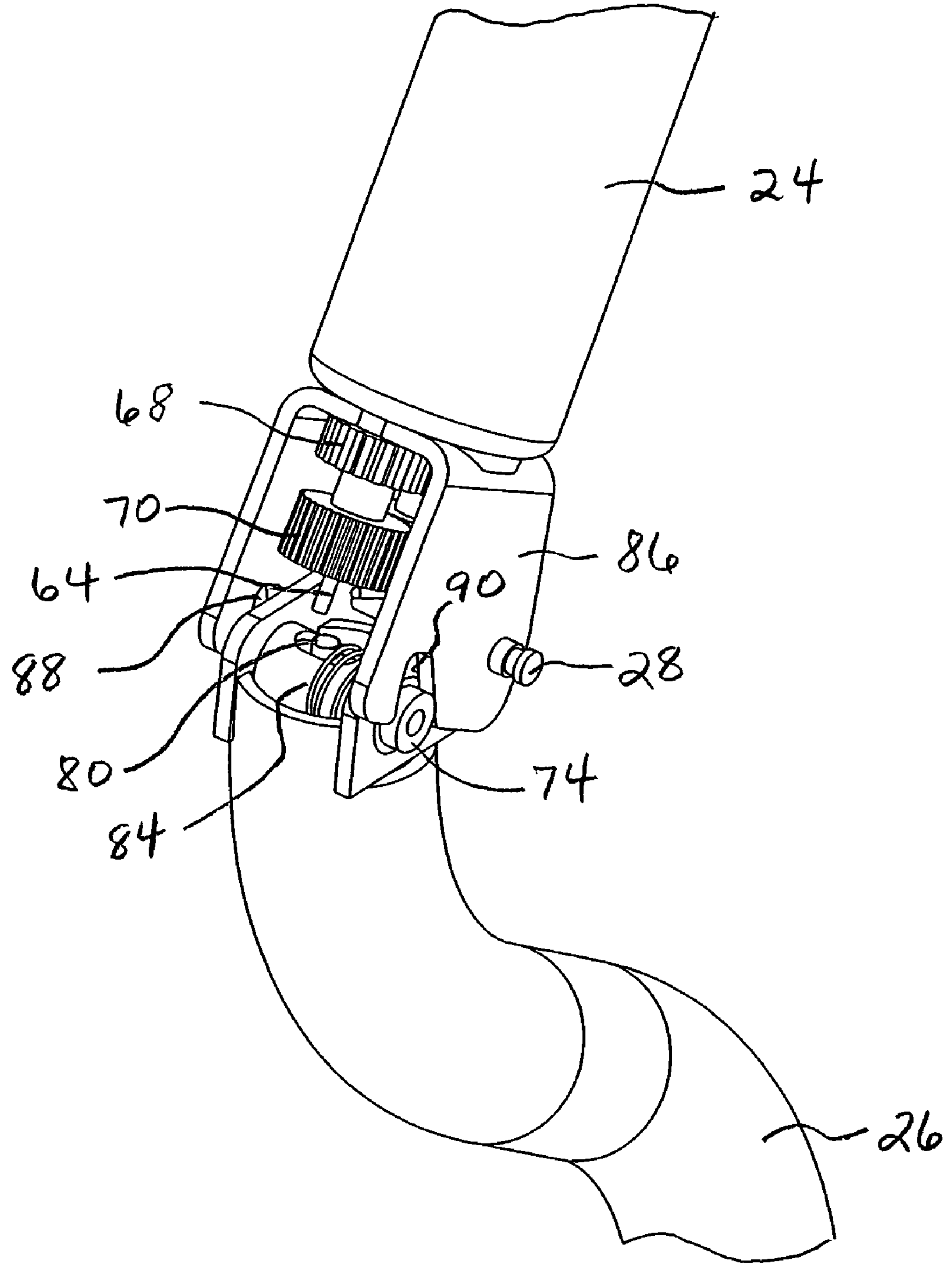
FIG. 3 is a perspective view of one embodiment of the coupling of a hand grip to a lever in the motion control system of FIG. 2.
Figure 4:
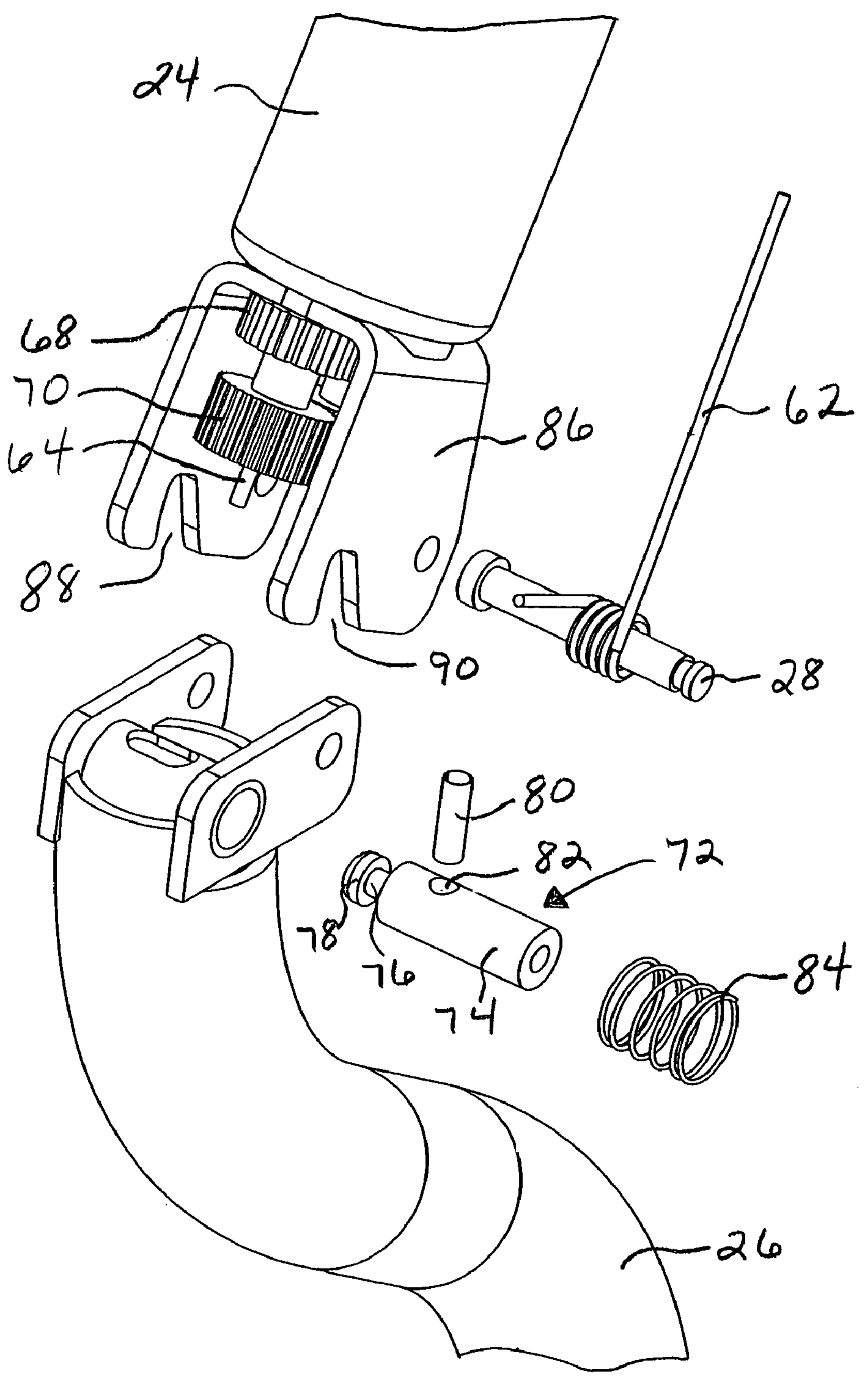
FIG. 4 is a partially exploded view of the coupling of FIG. 3.

The brake-related features will be described with reference to FIGS. 1, 2, 3, 4 and 5. FIG. 4 is a partially exploded view of FIG. 3, which illustrates one embodiment of the coupling between the lever 26 and the hand grip 24. In this embodiment, the pivot axis for "tipping" the hand grip is established by first pin 28. A helical portion of a spring 62 is wrapped around the pin 28. However, as shown in FIG. 4, the spring has a linear section that is sufficiently long to extend into the hand grip 28. The relationship of the two ends of the spring 62 provide biasing of the hand grip into a brake release position in which the wheel 12 is free to rotate, since no braking force is applied. However, the bias of the spring can be readily overcome by a user when breaking is desired.

When the hand grip 24 is tipped (pivoted) relative to the lever 26, tension is increased on a cable. In FIGS. 3 and 4, only a small portion of the cable 64 is shown. This brake cable extends along the length of the lever. The type of brake is not critical to the invention, but is shown in FIG. 2 as including a brake band 66. As would be readily understood by a person skilled in the art, the brake cable 64 may extend to the brake band, so that the tipping of the hand grip tightens the brake band so as to apply braking force to the hub 34. The applied force depends upon the degree of tipping. Significant to the invention, since the transmission permits both forward and rearward drive, the brake band may be anchored at its center instead of being anchored at an end. Anchoring at the center accommodates self-tightening in braking either forward motion or rearward motion.

Similar to adjustment of a bicycle brake, FIGS. 3 and 4 show a pair of thumb wheels 68 and 70 that permit adjustment of the braking mechanism. Thus, by rotating wheel 70, the "catch point" for applying braking force may be adjusted. Brake adjustments are understood by persons skilled in the art.

Referring specifically to FIGS. 3 and 4, a parking brake mechanism includes a second pin 72. The pin has a large diameter portion 74 and a small diameter portion 76, as well as a head portion 78. A smaller third pin 80 extends into an opening 82 of the second pin. The function of the third pin is to provide a stop for a helical spring 84. This helical spring biases the parking brake pin 72 to the left, as viewed in FIGS. 3 and 4. This leftward position will be referred to as the "first condition" of the parking brake mechanism.

At the bottom of the hand grip 24 is a bracket 86 with a pair of slots 88 and 90. When the parking brake pin 72 is in its first condition, the left-hand slot 88 is aligned with the small diameter portion 76 of the parking brake pin 72. The length of the pin ensures that the large diameter portion 74 remains unexposed, so that the pin is misaligned with the right-hand slot 90. When the pin is in the first condition, the hand grip comes to rest in its brake release condition with the end of the right-hand slot resting against the small diameter portion 76 of the pin.

On the other hand, if the hand grip 24 is tipped and the user applies pressure at the head portion 78 of the parking brake pin 72, the pin will move to its second position, which is shown in FIG. 3. When the pressure on the hand grip is released, the right-hand slot 90 will be aligned with the large diameter portion 74 of the pin. The slot is dimensioned such that the large diameter portion of the pin will prevent the hand grip from returning to its brake release condition. Consequently, braking force is continuously applied without action by the user. This capability may be used in situations such as those in which the wheelchair is being transported within another vehicle (to prevent rolling) or is to remain in a particular position on a sloped surface.

The abutment of the bracket 86 of the hand grip 24 against the large diameter portion 74 ensures that the bias provided by the helical spring 84 does not release the brake. However, a user can release the parking brake with little effort. By tipping the hand grip 24 further away from its brake release condition, the bracket moves out of contact with the large diameter portion 74. This allows the helical spring 84 to return the parking brake pin to its first condition in which neither the left-hand slot 88 nor the right-hand slot 90 is in alignment with the large diameter portion 74. When pressure is again removed from the hand grip, tension on the brake cable 64 is relaxed and braking force is removed.

Figure 5:
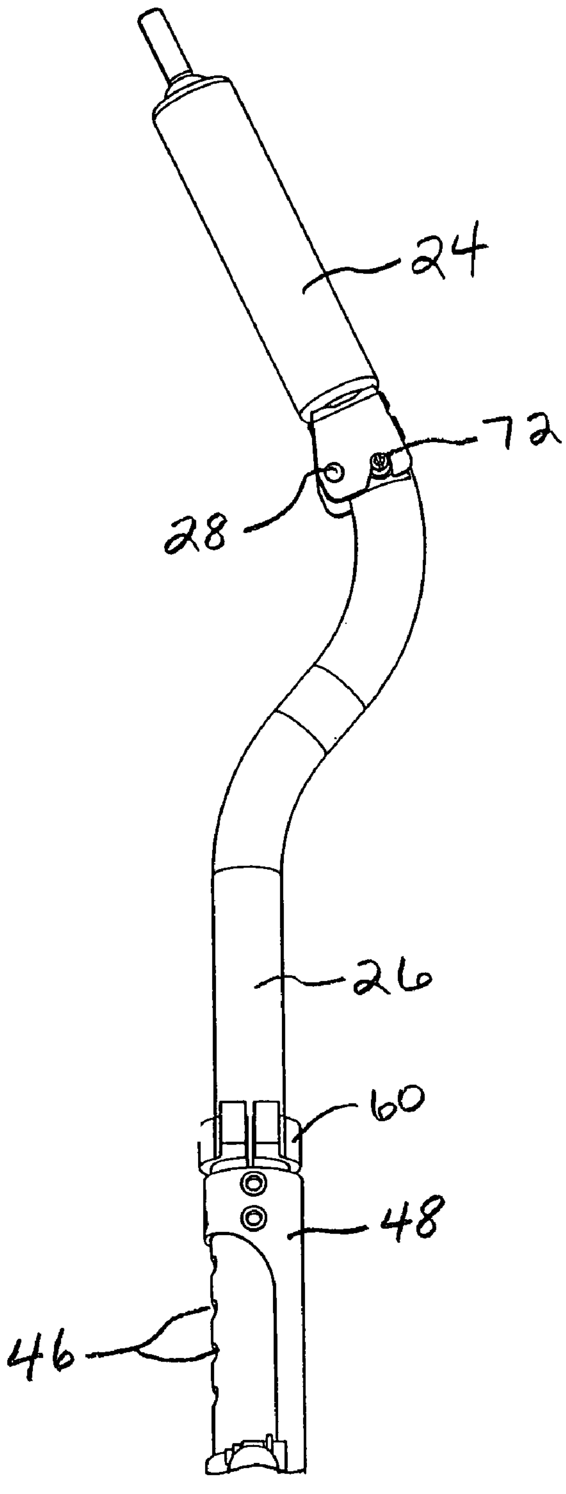
FIG. 5 is a perspective view of the upper portion of the motion control system of FIG. 2.

At least in some embodiments, the steering of the wheelchair 10 of FIG. 1 may be accomplished by manipulations at the hand grip 24. If levers are provided on both sides of the wheelchair, steering is possible using different applications of force on the two levers. However, in the embodiment of FIG. 1, additional steering capability is available, since the motion control system includes linkage to the front caster wheel 18. As shown in FIGS. 1, 2 and 5, the hand grip 24 is offset relative to the main portion of the lever 26 to provide a crank arm geometry that gives the rider control over rotation of a steering shaft. This steering shaft exits at the bottom of the lever tube. A universal joint 92 (FIG. 2) is fixed at the lower end of the steering shaft. The center of the universal joint is on the pivot axis of the lever 26. This counteracts any interference between force applied to the lever to accomplish a power stroke and force applied for the purposes of steering.

As shown in FIG. 1, above the front caster wheel 18 is a plate. This plate may be inserted on top of the conventional caster yoke 96 and below the nut that is commonly used. A block 98 is attached at the underside of the plate to rotationally lock the plate to the caster yoke. The block is fastened in position by screws that allow the assembly to be adjustable for different wheelchairs.

As noted, a universal joint 92 is at the bottom of the steering column of the lever 26. A first crank arm 100 is fixed to the bottom of this universal joint. A second universal joint 102 and a second crank arm 104 are located at the top of the plate 96 fixed to the front caster wheel 18. A tie rod 106 having yokes at each end connects the first crank arm 100 to the second universal joint 102. It has been determined that the connection of the caster crank arm 104 acts to prevent the front universal joint and the tie rod from rotating about the long axis of the tie rod. This constraint stabilizes the universal joint 92 at the bottom of the steering shaft. Without this constraint, the lower part of the universal joint 92 might require a bearing support.

It should be noted that even if the wheelchair 10 of FIG. 1 includes a second lever on the opposite side of the wheelchair, it is not necessary to duplicate the steering linkage. The opposite side caster wheel 20 will follow the direction dictated by the steered caster wheel 18, which is controlled by applying a small amount of angular force at the hand grip 24.

Retrofit Attachment

An attachment scheme for providing a retrofit lever propulsion assembly will be described with reference to the motion control system described above. However, the attachment approach may be applied to other lever propulsion systems for retrofit to a wide range of wheelchair geometries. The attachment will be described primarily with reference to FIGS. 6, 7 and 8. Additionally, while the attachment scheme operates particularly well for connecting a lever propulsion system, it also applies to attaching other types of propulsion systems to a wheelchair, including pushrim and motor-driven propulsion systems. However, the following description will be with respect to the preferred embodiment of attaching a lever propulsion system.

As best seen in FIG. 7, connected to the frame 16 of the wheelchair is a bracket 108 that supports an axle bearing 110. The axle bearing is dimensioned to receive an axle 112 of the wheelchair drive wheel 12. Quick-release approaches for coupling an axle to an axle bearing of a wheelchair are well known in the art. Often, a release button is included to allow the axle to be removed for purposes of storage or transportation. While such a release button may be included as an element of the attachment approach described in accordance with the invention, such a release is not critical, since the attachment utilizes other securing means.

Figure 6:
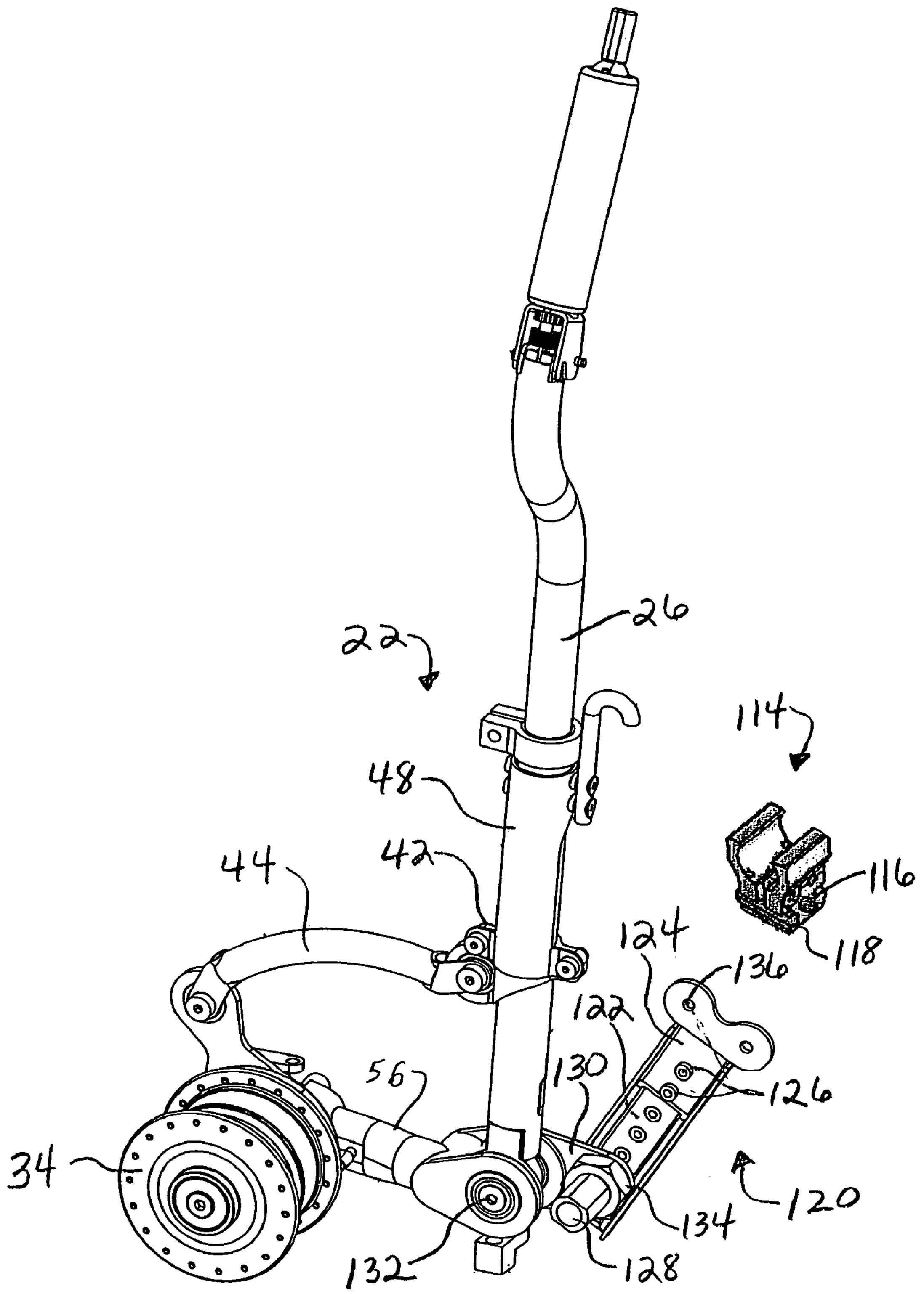
FIG. 6 is a perspective view of the retrofit-ready motion control system of FIG. 1.

The attachment assembly includes a clamp 114, as best seen in FIG. 6. The clamp is shown as having an arcuate interior surface to conform to standard tubular frame members. However, greater flexibility may be achieved by using a V clamp, since such clamps may be used for connection to tubular frame members of various diameters and potentially to non-tubular frame members.

The clamp 114 may be tightened onto a member using set screws or other fasteners. A secure fit is important. Projecting outwardly from the surface of the clamp is a projection, such as a pin 116. As will be described in detail below, this pin is one of the alignment features used to secure the motion control system 22 to the frame of the wheelchair. Once in place, a spring-biased latch 118 locks the motion control system in place.

In FIG. 7, the clamp 114 is shown secured to a horizontal frame member 119 of the wheelchair frame 16. Since the attachment approach of the present invention provides significant flexibility with respect to the position of the clamp, the location as shown in FIG. 7 is not significant. However, there are advantages to applying the attachment to a horizontal frame member, particularly one proximate to the seat of the wheelchair frame. This location is better equipped to withstand the forces applied when using lever propulsion. Nevertheless, the invention extends to applications in which the clamp is attached to a vertical frame member and to applications in which the alignment features are coupled laterally, similar to the lateral coupling of the "alignment features" of a latch for a car door.

Referring now to FIGS. 6 and 7, in addition to the clamp 114, the attachment assembly includes an attachment device 120 that is adapted and connected to provide three dimensions of adjustment, so as to accommodate retrofit to wheelchair frames of various geometries. Briefly, the attachment device is formed of two members 122 and 124 which enable length adjustability, the attachment device is connected at a pivot axis that enables angular adjustability (and therefore lateral adjustability), and the attachment device is connected using hardware which enables offset adjustability along its pivot axis.

In the embodiment shown in FIGS. 6 and 7, the length adjustability is a consequence of using first and second members 122 and 124 that can be coupled on the basis of the wheelchair frame to which the motion control system is to be attached. The second member 124 includes side rails that capture the first member 122, preventing lateral movement of one member relative to the other despite the forces that are applied in rowing the lever 26. While the first member fits within the second member, the two members cannot slide relative to each other. This is because the second member includes a series of internally threaded collars 126 that are dimensioned to fit within holes of the first member. The spacing between the collars matches that of the holes of the first member. In the relationship shown in FIGS. 6 and 7, two collars 126 remain outside of the holes within the first member, but a greater number or a lesser number of collars may be freed from the holes in attachment to different wheelchair frames. When the desired length is achieved, fastening members, not shown, are threaded into one or more of the collars that are received within the holes of the first member.

The end of the first member 122 is connected to the motion control system 22 by hardware which defines the pivot axis for the angular adjustability and which enables the offset adjustability. Thus, the angular and offset adjustabilities are coupled. FIG. 7 illustrates one embodiment of the hardware, but other arrangements may be substituted. An externally threaded member 128 is fixed to the attachment member 120 through a bracket 130. The externally threaded member defines the pivot axis of the attachment device. This pivot axis is spaced apart from the pivot axis 132 of the lever 26. One or more nuts 134 and the bracket 130 may be internally threaded. When the nut 134 is loosened, the attachment device 120 is free to rotate about its pivot axis. Additionally, the distance between the bracket 130 and the attachment device 120 can be varied, thereby providing the offset adjustability. This offset adjustability is significant, since the distance of the bracket 130 from the frame of a wheelchair will be dictated by the geometry of the quick-release mechanism for the axle bearing (110 in FIG. 7). This distance between the bracket 130 and the frame may vary among different wheelchairs. An advantage of this embodiment is that by coupling the offset and angular adjustabilities in this manner, the threaded member 128 will not rotate after the attachment device is coupled to the clamp, even if the nut 134 is removed.

In operation, the clamp 114 is fastened to the frame member 119 of the wheelchair frame 16. The position of the clamp will change from wheelchair-to-wheelchair, but the clamp is preferably connected to a horizontal frame member and most preferably to a horizontal frame member adjacent to the seat of the wheelchair. After the clamp has been properly fastened, the axle 112 of the wheel 12 is inserted into the axle bearing 110. The length, the angle, and the distance of the attachment device 120 relative to the bracket 130 are set such that an opening 136 at the end of the attachment device is aligned with the pin 116 on the clamp. As an alternative to the cylindrical opening 136, a slot or other reception feature may be formed at the end of the attachment device.

Figure 8:
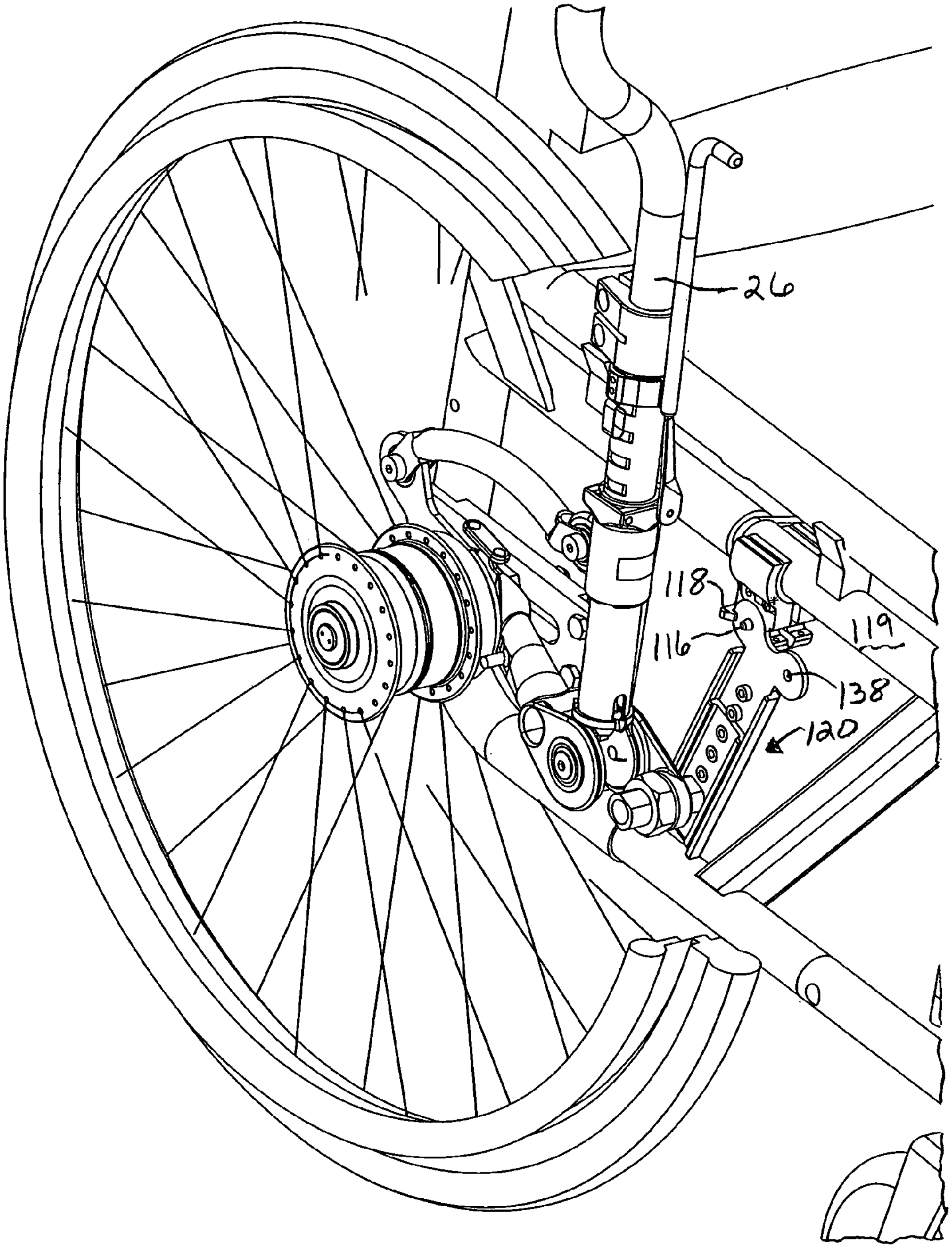
FIG. 8 is a perspective view of the retrofit assembly of FIG. 7 following attachment to the frame of the wheelchair.

FIG. 8 shows the latch 118 of the clamp 114 holding the attachment device in position after the pin 116 is properly seated. The edge of the attachment device 120 around the opening is arcuate, so that the latch works well, regardless of the angle of the attachment device. In the illustrated embodiment of the attachment device, a second opening 138 is included to increase the flexibility of use of the attachment device with different wheelchair frames.

While the retrofit assembly has been described as one in which the pin 116 is located on the clamp and the opening 136 is through the attachment device 120, this arrangement may be reversed. Locating the pin on the clamp may provide an advantage with respect to visibility during the alignment process for some applications of the invention, but the arrangement is not critical. Additionally, the invention extends to applications in which the attachment device approaches the clamp laterally. That is, the alignment features of the attachment device and clamp may be configured to couple in a manner similar to a latch of a car door.

What is claimed is:

1. An assembly for attachment to a frame of a wheelchair having an axle-coupling arrangement comprising:

a main wheel configured for connection to said axle-coupling arrangement so as to enable quick-release attachment and detachment of said main wheel to said frame;

a lever drive coupled to said main wheel to translate strokes of a lever to rotation of said main wheel;

a clamp configured for attachment to a frame member of said frame, said clamp having a first alignment feature; and an attachment device for releasably connecting said lever drive to said clamp, said attachment device having three dimensions of adjustment to accommodate attachment to wheelchair frames of various geometries, said attachment device having a free end with a second alignment feature configured to mate with said first alignment feature of said clamp, said attachment device being rotatable at a second end opposite to said free end to provide angular adjustability, said attachment device being adjustable in length to provide length adjustability, said attachment device being connected at said rotatable second end by hardware which provides offset adjustability in a direction generally parallel to a rotational axis of said main wheel.

2. The assembly of claim 1 wherein rotation of said second end to provide said angular adjustability occurs in a plane that is generally perpendicular to said rotation axis of said main wheel.

3. The assembly of claim 1 wherein said hardware which provides said offset adjustability includes a cooperation of threaded elements to displace said attachment device as a consequence of relative rotation of said threaded elements, said attachment device being threaded to said hardware such that said angular adjustability is enabled by a threaded connection of said hardware and said attachment device.

4. The assembly of claim 1 wherein a first one of said first and second alignment features is a pin and wherein said clamp includes a spring-biased member positioned to secure said attachment device when said pin is inserted into a second one of said first and second alignment features, said second one being an opening.

5. The assembly of claim 1 wherein said clamp includes a curved interior surface dimensioned for attachment to a tubular frame member.

6. The assembly of claim 5 wherein said clamp includes a spring-biased latch for releasably securing said attachment device when said clamp is clamped to a horizontal said tubular frame member.

7. The assembly of claim 1 wherein said main wheel includes an axle dimensioned for a slidable fit within said axle-coupling arrangement of said frame, said assembly further comprising a fixed-length reaction arm extending from a region about said axle to said lever and said second end of said attachment device.

8. The assembly of claim 6 further comprising an adjustable power link coupling said lever to a transmission-containing hub of said main wheel.

9. The assembly of claim 1 wherein said attachment device includes a fixed member and a telescoping member, said fixed and telescoping members having a plurality of coupling locations that enable selectability in locking said telescoping member relative to said fixed member, thereby providing said length adjustability.

10. The assembly of claim 9 wherein said second alignment feature of said attachment device is within a region of said telescoping member that includes an arcuate edge to accommodate attachment to said clamp at a range of available angles.

11. An assembly for attachment to an axle bearing and a frame of a wheelchair comprising:

a main wheel having an axle and central wheel hub, said axle being dimensioned to mate with said axle bearing;

a clamp dimensioned to clamp onto a frame member of said frame, said clamp including a first alignment feature located to be accessible from a direction perpendicular to an axis of said frame member when said clamp is attached thereto;

linkage extending from a region of said main wheel to a distance from said wheel hub; and a telescoping attachment device having a rotatable member that is connected to an end of said linkage opposite to said wheel hub, said rotatable member being connected to a pivot axis, said telescoping attachment device having a second member which adjustably extends from said rotatable member, said rotatable member being secured along said pivot axis such that said rotatable member is adjustable in location along said pivot axis, said second member including a second alignment feature configured to seat with said first alignment feature of said clamp;

wherein said first alignment feature of said clamp, said second alignment feature of said second member, said linkage and said telescoping attachment device releasably attach the main wheel to the frame.

12. The assembly of claim 11 wherein said rotatable member is secured along said pivot axis by threaded members that enable adjustment in said location along said pivot axis and that enable rotation of said telescoping member about said pivot axis.

13. The assembly of claim 11 wherein threaded hardware secures said rotatable member of said telescoping attachment device to permit said adjustable location along said pivot axis, such that rotation of said threaded hardware when said telescoping attachment device is rotatably fixed displaces said rotatable member along said pivot axis and such that rotation of said telescoping attachment device when said threaded hardware is rotatably fixed provides rotational adjustment relative to said clamp.

14. The assembly of claim 11 wherein said pivot axis is generally parallel to said axle of said main wheel.

15. The assembly of claim 11 wherein said wheel hub couples to said axle bearing of said wheelchair by a quick-release mechanism.

16. The assembly of claim 11 wherein said clamp is configured to mate with said telescoping attachment device when said clamp is secured to a horizontal said frame member.

17. The assembly of claim 11 wherein said first and second attachment features are a pin and an opening.

18. The assembly of claim 11 further comprising a lever connected to said linkage and said main wheel to drive said main wheel in response to lever motion, said linkage including a reaction arm.

19. An assembly for attachment to an axle bearing and a frame of a wheelchair comprising:

a main wheel having an axle and central wheel hub, said axle being dimensioned to mate with said axle bearing;

a clamp dimensioned to clamp onto a frame member of said frame, said clamp including a first alignment feature located to be accessible from a direction perpendicular to an axis of said frame member when said clamp is attached thereto;

linkage extending from a region of said main wheel to a distance from said wheel hub; and a telescoping attachment device having a rotatable member that is connected to an end of said linkage opposite to said wheel hub, said rotatable member being connected to a pivot axis, said telescoping attachment device having a second member which adjustably extends from said rotatable member, said rotatable member being secured along said pivot axis such that said rotatable member is adjustable in location along said pivot axis, said second member including a second alignment feature configured to seat with said first alignment feature of said clamp; wherein one of said clamp and said second member includes a latch mechanism to secure said telescoping attachment device to said clamp when said first and second alignment features are seated together.

20. The assembly of claim 19 wherein said second member has an edge geometry configured to accommodate operation of said latch mechanism over a range of angles of said second member relative to said clamp.

* * * * *